3,003,783
VEHICLE SUSPENSION CONTROL SYSTEMS
Antoine Brueder, Paris, France, assignor to Societe Anonyme Andre Citroen, Paris, France, a corporation of France
Filed Dec. 31, 1957, Ser. No. 706,532
Claims priority, application France Jan. 4, 1957
11 Claims. (Cl. 280—124)

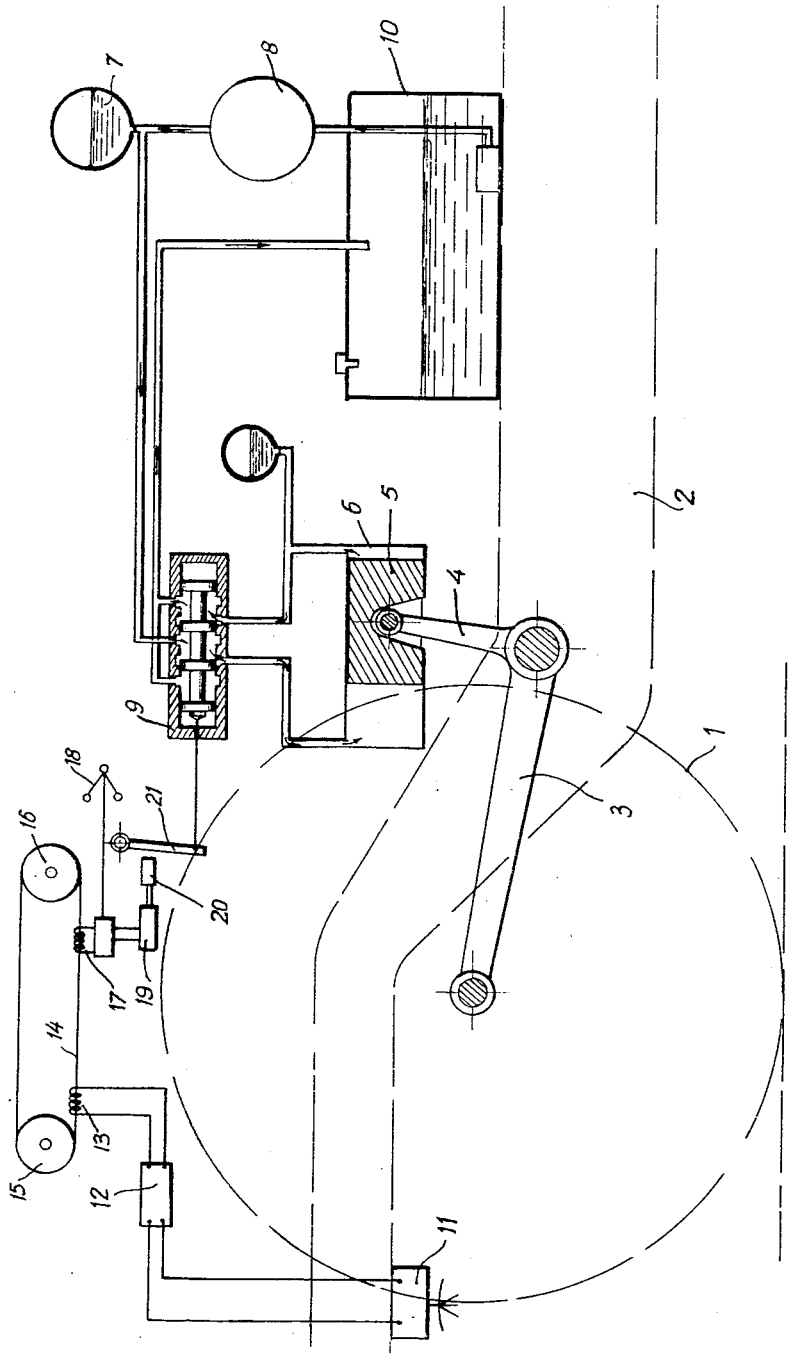

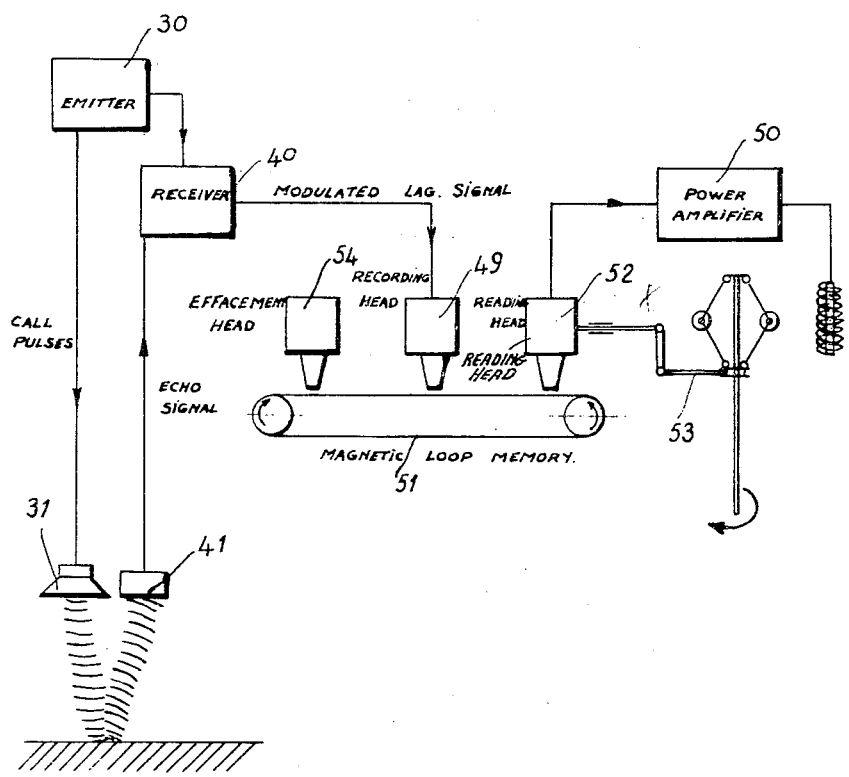

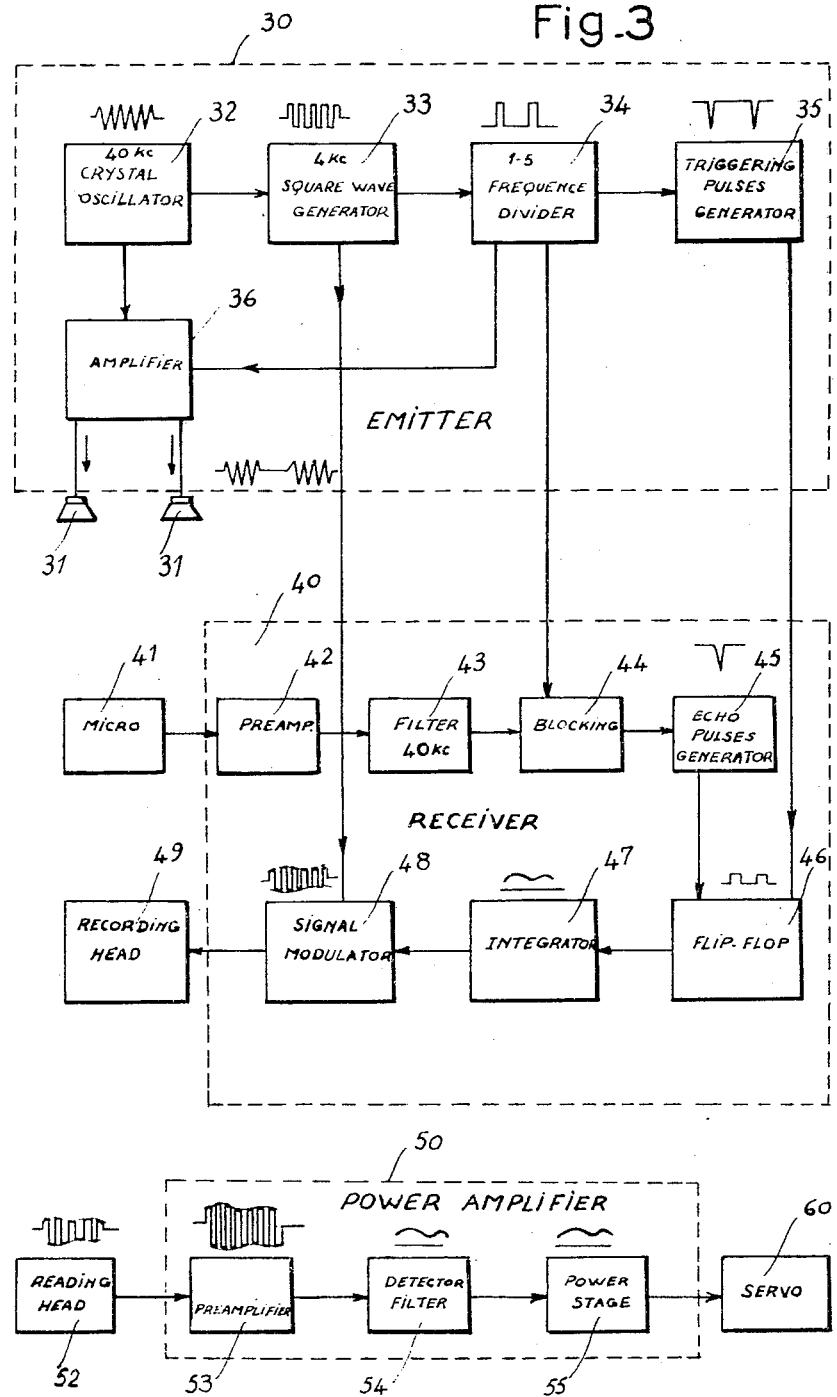

It is well known that problems concerned with the comfort and stability of vehicles, for example automobile vehicles, are solved by means of suspension systems, which are deformable systems comprising elastic members by which the wheels are fixed to the chassis.

Contact with an obstacle by which the wheel is lifted as it passes over it, produces an increasse in the amount of the reaction of the chassis on the corresponding support. This increase gives rise at the same time to movements of the chassis and variations in the adherence of the wheels. The inertia of a wheel tends in certain cases to cause it to exceed the height of the obstacle which acts as a spring-board. In addition, as the system is elastic, shocks tend to set up in it periodic vibrations which are difficult to damp. The present invention is directed to overcoming these drawbacks.

The invention consists in causing the relative position of the wheels and the vehicle to depend not only on gravity and reactions to ground inequalities of an elastic system, but on the application of forces internal to the vehicle, these forces being arranged so as to give at every instant to each wheel the position which it should occupy in order to give the chassis a constant position in a mean plane parallel to the ground.

One object of the invention is to provide the vehicle with an accumulator or reservoir of potential energy which can be supplied from the engine of the vehicle, and to provide means for utilising this energy to modify the position of the wheels, or of their support arms, with respect to the chassis of the vehicle.

By way of indication, this accumulator of energy may be mechanical and may consist of springs specially arranged, or it may be of the inertia type comprising de-clutchable fly-wheels. It may also be hydraulic, pneumatic, hydro-pneumatic, hydro-mechanical, or even electrical. With each wheel there may be associated one or a number of counter-weights, the movements of which are associated with those of the wheels, so that the component of the inertia forces which they generate may be always equal and of opposite sign to the inertia forces produced by the movements of the wheel. It will be understood that in this way, any movement transmitted to the wheels by a source of energy which is rigidly fixed to the chassis cannot affect the centre of gravity of the chassis. Thus, there is made available a means of displacing the wheels with respect to the chassis which only employs internal forces.

A further object of the invention is to provide a control device which enables the energy contained in the accumulator to act in an opportune manner on each wheel so as to permit it to follow exactly the irregularities of the road. This device consists essentially of a detector adapted to measure directly or indirectly the irregularities of the road and to supply these measurements to a servo-motor which controls the suspension members. This detector device may be a pilot wheel of negligible weight preceding each of the wheels of the vehicle. It may be an echo-sounding device of the interference type, based on the reflection of electromagnetic, ultrasonic or light waves.

In the case in which it is decided to measure this height at a given fixed distance in front of each wheel, the indications of the detector device should only be used with a certain delay which is a function of the speed of the vehicle; it is also possible however, always in accordance with the invention, to vary in accordance with the speed of the vehicle, the distance at which the measurement of height is taken, either system being able to achieve the same object, which is to cause the signal supplied by the apparatus to coincide with the passage of the obstacle under the wheel.

In the case in which the first arrangement is employed (that is to say the signal is used with a delay which is a function of the speed), it may consist in recording the indications of the measuring apparatus on a magnetic wire or disc, driven at a speed which is a function of the speed of the vehicle, and in their utilisation by a reading device, the displacement of which along the wire or the disc with respect to the recording position is also a function of the speed, in order to compensate for the inertia of the mechanism, when this is required.

It will be seen that, contrary to the use of the usual kinds of suspension, which seek to isolate the chassis as far as possible from the inequalities of the road, by reducing to the maximum extent the weight of the non-suspended parts, and by interposing between these and the suspended parts very elastic members which tend inevitably to rebound and to vibrate, vehicles constructed in accordance with the invention adapt themselves to the inequalities of the road by desired forced deformations of their articulations, and necessarily keep an invariable position with respect to the mean plane of motion, represented by the road. It will further be seen that the mechanism which determines the position of the wheels with respect to the chassis may be irreversible. Also, it can be seen that the ratio between the suspended weight and the non-suspended weight does not affect the road performance in any way, and that it is thus possible, without any disadvantage from this point of view, to construct vehicles which are just as light as it is possible to make them. It can further be seen that, the pressure of the wheels on the ground being constant, the road-holding qualities and the aptitude to take turnings rapidly cannot be affected by the inequalities of the ground.

In order to give an example, if a vehicle arranged in accordance with the invention is travelling at high speed along a flat and level road and abruptly comes up against a paving stone, the wheels of the vehicle at the moment of touching this stone would be lifted upwards towards the chassis, so that their pressure on the upper part of the paving stone would not be greater than it was immediately before on the road, and the vehicle would remain exactly in the same plane.

It can readily be seen by this example that the present suspension is an active suspension, the principle of which is entirely different from that of the passive suspensions constructed up to the present time.

Finally, it will be observed that the invention is applicable to vehicles of all types, for example motor-cycles, lorries, vehicles for negotiating any kinds of ground, on wheels or on tracks, and also to fast ships or hydro-planes which are supported on articulated floats. This latter application of the invention is of particular interest, since fast boats, for example motor-boats cannot generally retain their speed in choppy water. By virtue of floats or skids mounted in accordance with the invention, they can retain a horizontal position in spite of the swell, the speed of movement of the latter being negligible with respect to that of the boat and being furthermore compensated by a special setting of the memory device.

In the particular case of aircraft, it is a further object of the invention to cause the machine to follow, not a horizontal path parallel to the ground, but a curve tangential to the ground, this curve being a function of the value of the vertical resultant, as this can be measured by the intensity of the shock at the moment of touching-down.

One form of embodiment of a suspension for a vehicle in accordance with the invention will now be described by way of example only, reference being made to the accompanying drawings, in which:

FIG. 1 is a diagram of a suspension installation for a wheel of a vehicle.

FIG. 2 is a schematic diagram of the general arrangement of a height-detector device.

FIG. 3 is a diagram of the various members constituting the height-detector device proper.

Referring now to the drawings, a vehicle wheel 1 is mounted on the chassis 2 by a pivoted arm 3 comprising a bell-crank 4, the position of which is rigidly fixed to a piston 5.

The piston 5 is contained in a cylinder 6 supplied with fluid under pressure derived from a reservoir 7 which is put under pressure by the motor 8. This supply is controlled through the intermediary of a distributor 9 with four channels, which permits the fluid under pressure to be admitted to each face of the piston and the return of this fluid to the tank 10.

In accordance with the invention, the valve 9 is controlled by a reading device for the inequalities of the ground. This device is constituted by a transmitter-receiver of electro-magnetic waves 11 (radar) which emits waves towards the ground and measures the distance from the ground by the phase-displacement of the return signals. The signals received by this apparatus are converted to linear variations of voltage by a transformer 12 which supplies an induction coil 13 acting on a magnetic wire 14. This wire is driven by means of pulleys 15 and 16, the speed of which varies with that of the vehicle; this wire affects in its turn an induction coil 17.

The position of this coil 17 with respect to the coil 13 is regulated by a centrifugal governor 18, and the indication supplied by this coil is transmited to a translation device 19 supplying an electro-magnet 20; the latter controls the slide-valve distributor 9 through the intermediary of a pivoted arm 21.

It will be understod that by virtue of this arrangement, the inequalities of the ground are converted to pressure signals through the medium of the slide-valve 9 which is actuated with the desired delay so that by the hydraulic pressure, the wheel is given at every instant the position which it would itself take-up in following the inequalities of the ground.

In certain cases, it will be an advantage to actuate the servo-motor also by means of members responsive to the speed of the vehicle so that the quantity of internal energy employed in regulating the position of the support points of the vehicle may be proportional not only to the quantitative indications of the detector, but also to the speed of the vehicle in order to take account of inertia.

FIGS. 2 and 3 show the constitution and the operation of a radar device which is suitable for the object desired, that is to say which enables measurement to be made at every instant of the height H between the ground and the chassis at a point located in front of a wheel of the vehicle, and to deliver to the servo-controls of the suspension an output voltage proportional to the said height, the application of this voltage being furthermore suitably retarded by means of a memory device which takes account of the speed of the vehicle, as has already been indicated above.

In a general way, the device shown in FIG. 2 comprises a transmitter assembly 30 which supplies a suitable number (one for each wheel concerned) of wave-emitters or tweeters 31 at their natural frequency with waves of ultra-sonic frequency of a duration of a few periods repeated at low frequency. It comprises in addition a same number of receiver units 40, each of which receives from a wave receiver 41, tuned to the frequency of transmission, a signal corresponding to the trains of return waves or echo signals, a wave receiver being associated with each wave-emitter.

The echo signals are de-phased on the emission trains by a period which is proportional to the height between the ground and the chassis.

They are suitable amplified and filtered and the reception is blocked during the periods of transmission.

A special circuit converts the displacement in time between the emitted trains of waves and the received echo-signals to a voltage proportional to the height H, which voltage is modulated and recorded on the magnetic strip 51.

Finally, a moving reading head 52 is brought more or less close to the recording head 49, depending on the speed of forward motion of the vehicle (correction device) so that the signal is only read at the instant when the action should be taken, taking account of dead time.

The output voltage from the reading head is amplified in a suitable manner by a power amplifier 50 which supplies the servo-control of the suspension.

In a more detailed manner, if reference is now made to FIG. 3, it can be seen that the transmitter comprises a master-oscillator 32 controlled by a quartz crystal and supplying an ultra-sonic low frequency (for example of 40 kcs.) which constitutes the basic oscillation.

This oscillation supplies a multi-vibrator frequency-divider which allows to pass for example one oscillation in five, followed by a flip-flop device which again divides the frequency by two, the unit constituting the generator 33 of square wave signals at a frequency of 4 kcs., a fraction of the basic frequency. This intermediate frequency also serves in the modulator 48 of each receiver unit to modulate the signals intended for transmission to the recording heads 49.

A second frequency divider 34 with a ratio of 1 to 5, supplied by the square signals from the generator 33, produces square signals of the same duration but repeated at the new frequency, called the repetition frequency, which is therefore 800 cycles per second in the example chosen.

These signals are then differentiated and detected so as to obtain a negative impulse derived from the rear flank of the square impulse passing out of the frequency divider 34, in the triggering impulse generator 35.

The latter impulses coming from the generator 35 mark the moment of the end of transmission of each emitted train of waves.

On the other hand, these square signals derived from the frequency divider 34 which are short and at the repetition frequency, determine in the amplifier 36 the amplification of the basic oscillations transmitted by the oscillator 32, so that each train of oscillations at the output of the amplifier 36 comprises a few cycles, for example five in the present case, of the basic frequency of 40 kcs., repeated every $\frac{1}{800}$ of a second (frequency of repetition of the wave trains).

This transmission power amplifier 36 supplies directly the two tweeters 31 which are tuned to the basic frequency. The impulse-working of the amplifier enables an appreciable gain to be obtained in transmission frequency, starting with reduced power supply.

The receiver units 40 are identical and are each associated with a wave receiver 41 which supplies the parasitic echo impulses produced by all the surrounding noises.

They each comprise a pre-amplifier 42 which gives the echo impulses a usable value.

The impulses received are then filtered at 43 by:

Rejection of signals less or greater than a predetermined value;

Passing through a band-pass filter tuned to 40 kcs.

Their amplification is conditioned in the blocking apparatus 44 by the absence of an emission train (indicated by the frequency-divider 34), so as to block the reception during transmission of the trains.

The signals thus filtered are supplied to the echo-impulse generator 45, in which they are detected, using full-wave detection, integrated, and amplitude-limited by amplification, so as to obtain square signals during the reception of each echo train.

These square signals are then differentiated and detected in order to supply a negative impulse corresponding to the end of the echo train. This impulse marks the instant of ending of reception of each train of echo waves. The whole of these operations is effected by the echo-impulse generator 45.

A flip-flop device 46 actuated by the release impulses derived from the triggering impulses generator 35 is blocked by the echo impulses obtained from the generator 45.

The square signal delivered by the flip-flop 46 (the duration of which is in consequence proportional to the height H) produces in the integrator 47 a signal having an amplitude proportional to H.

This signal modulates the square signals of intermediate frequency 4 kcs. delivered from 33 into the signal modulator 48, in order to produce an alternating voltage.

This modulated voltage excites the recording head 49, which transfers the informations received to a magnetic loop.

As has been shown in FIG. 2, the transmission memory device comprises a magnetic loop 51 driven in rotation in any suitable manner, which after having passed under the fixed recording head 49 passes under the reading head 52, the position of which with respect to the head 15 is controlled by a correction device 53 responsive to the speed of the vehicle; it then returns to the recording head 49 after having passed under an effacing head 54, as is well known.

In consequence, the reading head 52 reads the information from the magnetic loop after a time which is regulated by the correction device.

From the diagram of the power-amplifier device 59 shown in FIG. 2, it can be seen that the voltage supplied by the reading head 52 is applied to a preamplifier 53, after which the modulated voltage is subjected to a full-wave detection and roughly filtered in the detector-filter 54, after which it is supplied to the power amplifier 55. The latter supplies a current of modulated voltage, the intensity of which is sufficient to apply directly to the servo-control 60.

It would of course be possible to use other circuit arrangements to achieve the object envisaged by the invention, the form of embodiment described above being considered only as one example of embodiment to which the invention can in no way be restricted.

It will be convenient to construct the various stages of the electronic apparatus used, by the use of transistors.

It should also be stated that in fact the same apparatus can be used alternately as a tweeter wave-emitter and as a wave receiver, these apparatus having been shown separately in order to simplify the description.

It will further be noted that the use of a musical emission frequency is also possible as a continuous oscillation, but in addition to the nuisance in hearing it, it is more difficult to filter and its reception is subject to fading as a result of the existence of stationary waves.

An ultra-sonic emission frequency considerably higher than that indicated is also not desirable because of the transmission loss in air which becomes prohibitive. In addition, this would involve passage into the range of frequencies which are dangerous to human beings.

The present form of embodiment has been described as an application to a road vehicle, but as has already been previously stated, the application of such an arrangement to an aircraft, whether it is provided with wheels, skids or floats, or again to a ship provided with floats, would remain within the scope of the present invention.

I claim:
1. Suspension apparatus for a vehicle, operable in dependence on irregularities of a surface over which the vehicle is to pass, said apparatus comprising: means for supporting said vehicle on said surface; an arm associated with each said means; an energy accumulator device, members for applying this energy to said arms so as to vary their positions with respect to the chassis of said vehicle; a servo-motor for controlling said members; a detector device for measuring the height from the ground of the inequalities in front of said supports and for supplying these measurements to said servo-motor device in order to control this latter device.

2. Apparatus in accordance with claim 1, in which the said servo-motor is constituted by a slide-valve distributor actuated by electrical means.

3. Apparatus in accordance with claim 1, in which the said detector device is constituted by an echo sounder employing electro-magnetic waves.

4. Apparatus in accordance with claim 1 comprising a memory recorder and an apparatus responsive to the vehicle speed and in which the indications of the said detector device, are transmitted to said servo-motor through the intermediary of said memory recorder controlled by said apparatus responsive to the speed of the vehicle, whereby said indications are re-transmitted to the servo-motor with a delay which depends on the speed of the said vehicle.

5. Apparatus in accordance with claim 1, in which the detector device is constituted by a radar system comprising: a transmitting unit for the transmission towards the ground of ultra-sonic wave-trains repeated at a repetition frequency; a receiver unit adapted to receive the echos of said wave trains from the ground; and a transmission unit and a power amplifier unit, for supplying suitable voltages from said receiver to the servo-control, said voltages being suitably modulated as a function of the said variation in height and suitably retarded in order to obtain the desired result.

6. Apparatus in accordance with claim 5, in which the transmitter unit comprises especially a basic oscillator, a square wave generator, a frequency divider, a triggering impulse generator, and an amplifier associated with wave-emitters proper.

7. Apparatus in accordance with claim 5, in which the receiver unit comprises especially: a wave receiver, a pre-amplifier coupled to said receiver, a filter coupled to said pre-amplifier, a reception-blocking device coupled to said filter, an echo-impulse generator coupled to said device, a flip-flop device coupled to said generator and the operation of which is initiated by the release impulses of the transmitter apparatus and is blocked by the echo impulses, an integrator coupled to said flip-flop device and a modulator coupled to said integrator.

8. Apparatus in accordance with claim 5, in which the memory correction-device and power amplifier comprises a recording head, a magnetic loop driven in rotation, a reading head, the position of which with respect to the recording head is determined by a device responsive to the speed of the vehicle, a pre-amplifier, a detector-filter, and a power amplifier supplying a modulated voltage, the current of which is applied to the servo-control of the suspension members.

9. Apparatus in accordance with claim 5, in which the frequency of the transmitted waves is of the order of 40 kcs., the said waves being repeated in trains at a repetition frequency of the order of 800 cycles per second, each train comprising about five cycles.

10. A method of controlling the suspension system of a vehicle in dependence on the inequalities of the surface over which the vehicle is about to pass, comprising the steps of: continuously exploring and measuring the variations in height of the chassis of the vehicle relative to the surface immediately ahead of the points of support of said vehicle on said surface; converting said variations to corresponding forces arranged to act on the suspensions of said points of support; and bringing said forces into action to maintain a constant trim of said vehicle in spite of said inequalities.

11. A method as claimed in claim 10, and comprising the further step of introducing a variable delay between the said exploration and the application of said forces to the suspension systems, said delay being variable in dependence on the speed of said vehicle.

References Cited in the file of this patent

UNITED STATES PATENTS

| | | |
|---|---|---|
| 2,003,823 | Bucklein | June 4, 1935 |
| 2,492,990 | Hanna | Jan. 3, 1950 |
| 2,568,401 | Lynn | Sept. 18, 1951 |
| 2,650,108 | Bruce | Aug. 25, 1953 |
| 2,860,889 | Hanna | Nov. 18, 1958 |